United States Patent
Oraw

(10) Patent No.: US 9,229,597 B2
(45) Date of Patent: Jan. 5, 2016

(54) INTEGRATED CAPACITIVE TOUCH SCREEN AND LED LAYER

(71) Applicant: Nthdegree Technologies Worldwide Inc., Tempe, AZ (US)

(72) Inventor: Bradley Steven Oraw, Chandler, AZ (US)

(73) Assignee: Nthdegree Technologies Worldwide, Inc., Tempe, AZ (US)

( * ) Notice: Subject to any disclaimer, the term of this patent is extended or adjusted under 35 U.S.C. 154(b) by 195 days.

(21) Appl. No.: 14/186,172

(22) Filed: Feb. 21, 2014

(65) Prior Publication Data

US 2014/0240618 A1    Aug. 28, 2014

Related U.S. Application Data

(60) Provisional application No. 61/768,294, filed on Feb. 22, 2013.

(51) Int. Cl.
*G06F 3/044* (2006.01)

(52) U.S. Cl.
CPC ...... *G06F 3/044* (2013.01); *G06F 2203/04103* (2013.01); *H01H 2239/006* (2013.01)

(58) Field of Classification Search
CPC .......... G06F 3/044; G06F 2203/04103; H01H 2239/006
USPC ...................... 178/18.01–19.07; 345/173–178
See application file for complete search history.

(56) References Cited

U.S. PATENT DOCUMENTS

| 8,610,009 B2 | 12/2013 | Yilmaz et al. |
| 8,638,314 B2 | 1/2014 | Sleeman |
| 2012/0206392 A1 | 8/2012 | Ng et al. |

*Primary Examiner* — Michael Pervan
(74) *Attorney, Agent, or Firm* — Patent Law Group LLP; Brian D. Ogonowsky

(57) ABSTRACT

A layer of microscopic printed VLEDs is sandwiched between a first conductor layer and a transparent second conductor layer so that light exits the second conductor layer. Touch sensor electrodes are formed overlying the VLED layer so that the VLEDs illuminate the touch sensor. In one embodiment, the touch sensor electrodes are independent from the conductor layers for the VLEDs. In another embodiment, the transparent second conductor layer also serves as a touch sensor electrode. In another embodiment, both the conductor layers for the VLEDs serve as touch sensor electrodes. The conductor layers for the VLEDs may be segmented in groups to selectively illuminate groups of the VLEDs under each touch sensor position. The touch sensor electrodes may be transparent or opaque, depending on whether the electrodes are intended to allow the VLED light to pass through.

27 Claims, 4 Drawing Sheets

INTEGRATED CAPACITIVE TOUCH SCREEN AND LED LAYER

CROSS-REFERENCE TO RELATED APPLICATIONS

This application is based on U.S. provisional application Ser. No. 61/768,294, filed Feb. 22, 2013, by Bradley Steven Oraw, assigned to the present assignee and incorporated herein by reference.

FIELD OF THE INVENTION

This invention relates to forming an illuminated touch screen and, in particular, to forming a capacitive touch screen integrated with a layer of light emitting diodes (LEDs).

BACKGROUND

Capacitive touch sensors allow a user to make a selection by touching an area of the sensor surface. Such sensors may be transparent, where a touch screen is provided over a conventional display screen, and the user touches a displayed icon to select it. Other touch sensors do not need to be transparent, since there is no display screen behind it.

For touch sensors that do not overlie a display screen, there may be a need to uniformly illuminate the sensor or identify touch positions on the sensor by illuminated areas.

U.S. Pat. No. 8,638,314 describes an electro-luminescent (EL) layer (typically a phosphorescent powder) sandwiched between upper and lower electrodes of a capacitive touch sensor, where the top electrode is transparent. The sensor may be for a single touch button or part of a larger sensor where touching different areas of the sensor signify a different selection. An electric field across the EL layer causes it to illuminate. For the touch sensor function, an increase in the mutual capacitance between the opposing electrodes indicates that the user's fingertip is touching the spot directly above the electrode. A controller rapidly time-multiplexes a high voltage EL energization voltage with a touch detection signal to multiplex the functions of the two electrodes. Therefore, the EL appears to be constantly on to illuminate the touch sensor. The shapes of the electrodes could be patterned so that the abutting EL portion illuminates with the same shape (e.g., to identify a number 0-9). One problem with such an EL layer is that a high voltage DC to AC converter is needed to supply the high voltage (over 100V) to the EL layer. The multiplexer must be designed to handle the high voltage at the high switching frequency. Further, since the optical characteristics of the phosphorescent layer are related to the thickness of the layer, and the operation of the touch sensor is also related to the gap between the electrodes, there is some trade-off between the optimal EL design and the optimal touch sensor design. Further, the EL layer becomes saturated beyond a certain voltage, so brightness control is limited. Additionally, the design only works for touch sensors of the type that sense the change in mutual capacitance between upper and lower electrodes. Thus, the EL function could not be used with a planar type of touch sensor, where all the electrodes are formed on a single layer. Other drawbacks exist.

US Patent Application Publication 2012/0206392 describes a transparent touch pad with an array of conventional packaged LEDs on a printed circuit board attached to the back of the touch pad to backlight the touch pad. Such an arrangement is expensive and relatively thick. Also, there is poor light coupling to the touch pad. Such an arrangement is analogous to the touch pad being a touch screen laminated over a display screen.

What is needed is a different design for an illuminated capacitive touch sensor that does not suffer from the drawbacks of the prior art.

SUMMARY

In one embodiment, a layer of microscopic vertical LEDs (VLEDs) is printed on a first conductor layer on a substrate. The LEDs are printed as a monolayer using an LED ink. Substantially all the LED can be oriented in the same way, such as anodes up. After curing the LED ink, a transparent conductor layer is formed over the top electrodes of the LEDs so that the LEDs are electrically connected in parallel by the two conductor layers.

If the LED light is to be wavelength converted, a thin layer of phosphor may be deposited over the transparent conductor layer. Some of the LED light (e.g., blue light) leaks through and combines with the phosphor light to produce any color.

If needed, a dielectric spacer layer is then deposited over the transparent conductor layer.

An array of transparent electrodes is then patterned over the spacer layer to create a planar touch sensor. A thin transparent film may then be provided over the electrodes. Either the mutual capacitance between adjacent electrodes is sensed to determine whether a finger is proximate to the electrodes, or the capacitance of a single electrode (self-capacitance) is sensed to determine whether a finger is proximate to the electrode. The finger acts as an additional capacitor connected to ground.

In another embodiment, some or all of the touch sensor electrodes are opaque since the opaque electrodes are either not overlying VLEDs or are intentionally used to mask and shape the light emission from the touch sensor. In one embodiment, the touch sensor electrodes are formed as one or more rings surrounding a subset of the VLEDs.

A low DC voltage is applied across the LEDs to illuminate the LED layer. A conventional capacitance sense detector is coupled to the sensor electrodes, such as via transparent traces leading to the electrodes. Therefore, there is no tradeoff between the LED operation and the touch sensor operation, since they operate independently. The LEDs may be selected to emit any color, or the LED light may be wavelength-converted by a layer of phosphor or other wavelength conversion material (e.g., quantum dots, dyes, etc.).

The resulting illuminated touch sensor is thus an integrated sensor and LED layer. The device is extremely thin, flexible, low cost, and can be fabricated using a roll-to-roll method.

In another embodiment, the transparent film that is touched serves as a starting substrate for the successive printing of the various layers in the reverse order. No laminating steps are needed.

In another embodiment, the transparent top anode conductor layer for the LEDs forms a planar electrode for the touch sensor. Other transparent electrodes are not used as a conductor for the LED layer. The mutual capacitance between adjacent electrodes is used to determine if the user is touching the area. The DC LED voltage does not have to be multiplexed with the touch sensor detection, so simultaneous operation is possible.

In another embodiment, the anode and cathode conductor layers for the LEDs also act as the electrodes for detecting the mutual capacitance between the two layers.

The LED conductor layers may be electrically isolated to selectively illuminate different areas of the touch sensor, such as for feedback or otherwise draw attention to a particular touch position. Alternatively, all the LEDs may be simultaneously illuminated for lighting the entire sensor. Since many thousands of microscopic LEDs are printed in the LED layer, the LEDs can be printed in different patterns to identify the functions of different touch areas of the sensor, such as by displaying the numbers 0-9 in a keypad touch sensor.

In some embodiments, no multiplexer is necessary for changing the functions of the electrodes between touch sensing electrodes and LED-energization electrodes. The resulting illuminated touch sensor requires much less circuitry than the prior art illuminated touch sensor, is physically flexible, is very thin, can be produced for a low cost, is capable of being manufactured at high speeds using a roll-to-roll process, allows different types of touch sensor techniques to be used, and has additional advantages.

Other embodiments are disclosed.

BRIEF DESCRIPTION OF THE DRAWINGS

FIG. 2 is taken across a horizontally bisected FIG. 3.

Elements that are similar or identical in the various figures are labeled with the same numeral.

DETAILED DESCRIPTION

The GaN-based micro-LEDs used in embodiments of the present invention are less than a third the diameter of a human hair and less than a tenth as high, rendering them essentially invisible to the naked eye when the LEDs are sparsely spread across a substrate. The number of micro-LED devices per unit area may be freely adjusted when applying the micro-LEDs to the substrate. A well dispersed random distribution across the surface can produce nearly any desirable surface brightness. Lamps well in excess of 10,000 cd/m$^2$ have been demonstrated by the assignee. The LEDs may be printed as an ink using screen printing or other forms of printing. Further detail of forming a light source by printing microscopic vertical LEDs, and controlling their orientation on a substrate, can be found in US application publication US 2012/0164796, entitled, Method of Manufacturing a Printable Composition of Liquid or Gel Suspension of Diodes, assigned to the present assignee and incorporated herein by reference.

Figure 1:
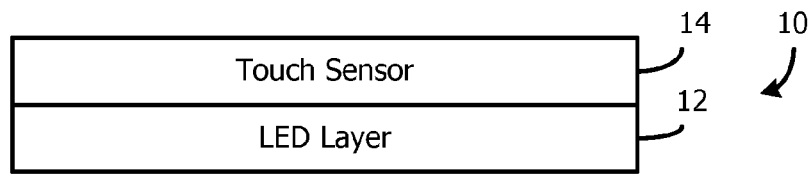
FIG. 1 illustrates the basic design of an illuminated touch sensor in accordance with one embodiment of the invention, where a layer of vertical LEDs is integrated with a capacitive touch sensor.

FIG. 1 illustrates the basic design of an illuminated touch sensor 10 in accordance with one embodiment of the invention, where a layer 12 of printed microscopic LEDs is integrated with a capacitive touch sensor 14.

Figure 2:
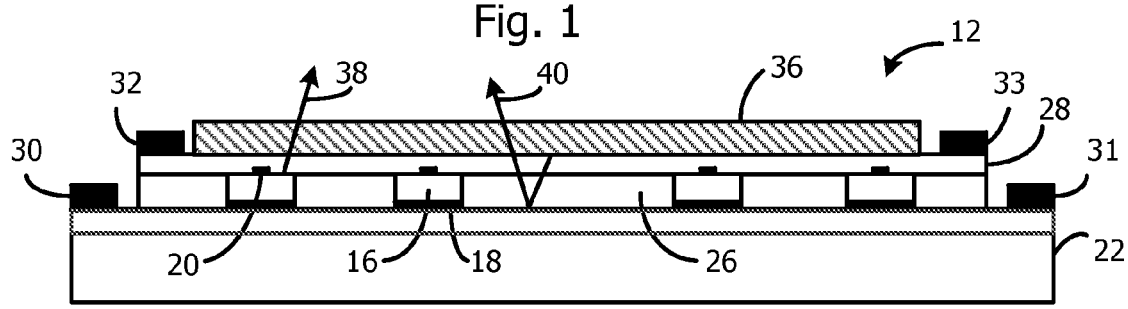
FIG. 2 is a simplified cross-section of a monolayer of printed, microscopic vertical LEDs emitting light through a phosphor layer.

FIG. 2 is a cross-sectional view of a layer of vertical LEDs 16 (VLEDs) that may be used in the invention. Each LED 16 includes standard semiconductor GaN layers, including an n-layer, and active layer, and a p-layer.

In one embodiment, an LED wafer, containing many thousands of vertical LEDs, is fabricated so that the bottom metal cathode electrode 18 for each LED 16 includes a reflective layer (a mirror). The reflective layer should have a reflectivity of over 90% for visible light. The top metal anode electrode 20 for each LED 16, also reflective, is small to allow almost all the LED light to escape the anode side. There is some side light, depending on the thickness of the LED. The anode and cathode surfaces may be opposite to those shown.

The LEDs are completely formed on the wafer, including the anode and cathode metallizations, by using one or more carrier wafers during the processing and removing the growth substrate to gain access to both LED surfaces for metallization. The semiconductor surfaces of the LEDs may be roughened by etching to increase light extraction (i.e., decrease internal reflections). After the LEDs are formed on the wafer, trenches are photolithographically defined and etched in the front surface of the wafer around each LED, to a depth equal to the bottom electrode, so that each LED has a diameter less than 50 microns and a thickness of about 4-8 microns. A preferred shape of each LED is hexagonal. The trench etch exposes the underlying wafer bonding adhesive. The bonding adhesive is then dissolved in a solution to release the LEDs from the carrier wafer. Singulation may instead be performed by thinning the back surface of the wafer until the LEDs are singulated. The LEDs 16 of FIG. 2 result, depending on the metallization designs. The microscopic LEDs are then uniformly infused in a solvent, including a viscosity-modifying polymer resin, to form an LED ink for printing, such as screen printing, or flexographic printing.

The LEDs may instead be formed using many other techniques and may be much larger or smaller. The LED layers described herein may be constructed by techniques other than printing.

If it is desired for the anode electrodes 20 to be oriented in a direction opposite to the substrate 22 after printing, the electrodes 20 are made tall so that the LEDs 16 are rotated in the solvent, by fluid pressure, as they settle on the substrate surface. The LEDs 16 rotate to an orientation of least resistance. Over 90% like orientation has been achieved, although satisfactory performance may be achieved with over 75% of the LEDs being in the same orientation.

In FIG. 2, a starting substrate 22 is provided. The substrate 22 may be opaque, transparent, or semi-transparent and is preferably thin for light weight, low cost, and ease of processing. The substrate 22 may be a suitable polymer, such as polycarbonate, PMMA, or PET, and may be dispensed from a roll. The substrate 22 may even be a coated paper or cloth. The substrate 22 can be any size suitable for the touch sensor.

If the substrate 22 itself is not conductive, a reflective conductor layer 24 (e.g., aluminum) is deposited on the substrate 22 such as by printing.

The LEDs 16 are then printed on the conductor layer 24 such as by screen printing with a suitable mesh to allow the LEDs to pass through and control the thickness of the layer. Because of the comparatively low concentration, the LEDs 16 will be printed as a monolayer and be fairly uniformly distributed over the conductor layer 24. Any other suitable deposition process may be used.

The solvent is then evaporated by heat using, for example, an infrared oven. After curing, the LEDs 16 remain attached to the underlying conductor layer 24 with a small amount of residual resin that was dissolved in the LED ink as a viscosity modifier. The adhesive properties of the resin and the decrease in volume of resin underneath the LEDs 16 during curing press the bottom LED electrode 18 against the underlying conductor 24, making ohmic contact with it.

A dielectric layer 26 is then selectively printed over the surface to encapsulate the LEDs 16 and further secure them in position without covering at least one edge of the conductor layer 24. The ink used in the dielectric layer 26 is designed to pull back from the upper surface of the LEDs 16 during curing to expose the top anode electrodes 20, so etching the dielectric layer 26 is not required. If the dielectric covers the electrodes 20, then a blanket etch may be used to expose the electrodes 20.

A top transparent conductor layer 28 is then printed over the dielectric layer 26 to electrically contact the electrodes 20 and cured in an oven appropriate for the type of transparent conductor being used.

Metal bus bars 30-33 are then screen printed along opposite edges of the conductor layers 24 and 28 and electrically terminate at anode and cathode leads (not shown), respectively, for energizing the LEDs 16. If the bus bar ink is solvent based, it may be cured in an oven. If it is a radiation cured silver, it may be cured by exposing it to a UV light or electron beam curing system. The bus bars 30-33 will ultimately be connected to a positive or negative driving voltage.

Figure 3:
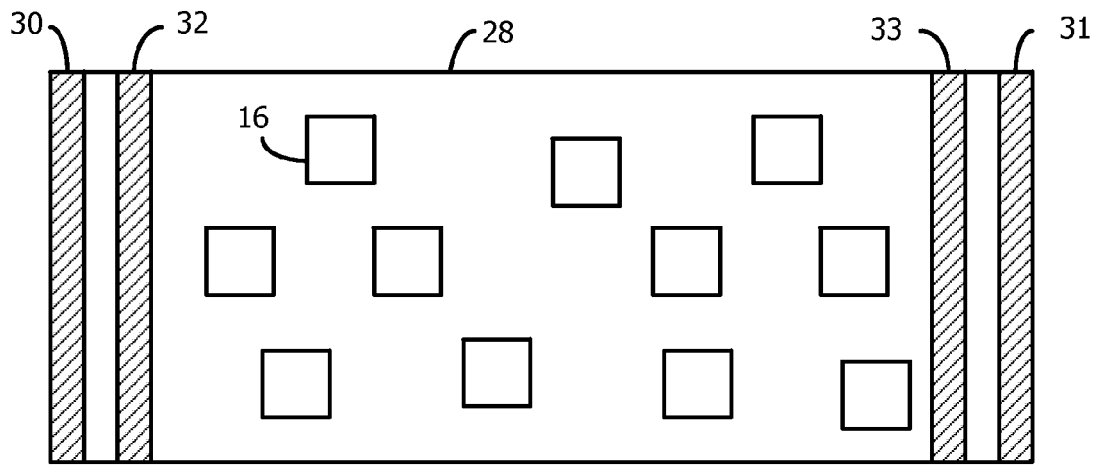
FIG. 3 is a top down view of the structure of FIG. 2, where

FIG. 3 is a top down view of FIG. 2 prior to the phosphor layer 36 being deposited. The cross-section of FIG. 2 is a horizontal bisection of FIG. 3.

The points of connection between the bus bars 30-33 and the driving voltage leads may be at opposite corners of each bus bar 30-33 for uniform current distribution along each bus bar 30-33 or may be at multiple points along each bus bar 30-33 to reduce the voltage drop across the bus bar 30-33 to improve electrical efficiency.

If a suitable voltage differential is applied to the anode and cathode leads, all the LEDs 16 with the proper orientation will be illuminated.

The transparent conductor (and transparent electrodes in the touch sensor) may be an indium-tin-oxide (ITO) layer or a layer containing silver nanofibers. The transparent conductor layer 28 may have a conductivity of 1 to 20 ohms/square, which is adequate for short spans with a low current. If the resistivity is too high due to the width of the transparent conductor layer 28, thin metal runners may be printed across the width and connected to the perpendicular metal bus bars 32/33 to create a more uniform voltage across the transparent conductor layer 28.

A phosphor layer 36 is then deposited, such as by screen printing, over the transparent conductor layer 28. If the LEDs 16 emit blue light, the phosphor layer 36 may be a YAG (yellow) phosphor in a polymer binder to create white light. Any colors can be created by various combinations of phosphors. Other wavelength-conversion materials may be used instead, such as quantum dots or dyes.

Light rays 38 and 40 are just two examples of how light is emitted by the LED layer 12. The light ray 38 from the LED 16 leaks through the phosphor layer 36. The light ray 40, generated by the phosphor layer 36, is reflected by the reflective conductor layer 24 and ultimately exits through the top surface. The blue light and the phosphor light combine.

Figure 4:
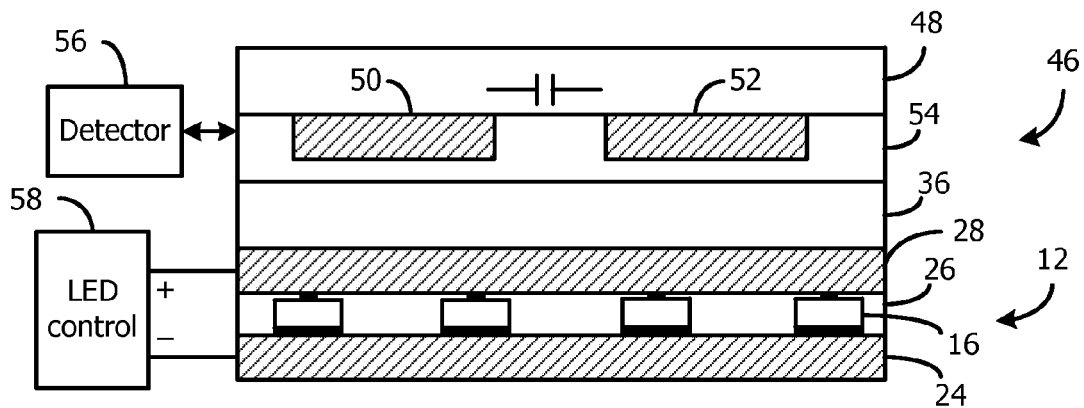
FIG. 4 is a cross-section of a small portion of an illuminated touch sensor, illustrating only one sensor touch position, where planar touch sensor electrodes overlie a layer of LEDs connected in parallel by a separate set of conductors.

FIG. 4 is a cross-section of a small portion of an illuminated touch sensor 46, which may be an embodiment of the illuminated touch sensor 10 in FIG. 1.

In FIG. 4, the LED layer 12 may the same as in FIG. 2. The touch sensor layer may be a laminated layer, or both the touch sensor layer and the LED layer are printed over the same starting substrate. In another embodiment, the starting substrate is the thin transparent film 48 that the user touches with his finger, and the LEDs and various conductor layers are printed over that substrate in a reverse order. The film 48 may be flexible or rigid. The film 48 may also be a thin plastic or glass plate.

A laminated structure will first be described. On top of the optional phosphor layer 36 is laminated the transparent film 48 having formed thereon, such as by printing, the transparent electrodes 50 and 52 (among possibly many other transparent electrodes). A transparent dielectric layer 54 covers the electrodes 50/52 and creates an adhesive surface for the lamination. The dielectric layer 54 may include phosphor powder in a silicone binder so as to obviate the phosphor layer 36.

In a more integrated approach, the starting substrate is the transparent film 48 (or a rigid transparent plate). The transparent electrodes 50 and 52 are then printed over the film 48, followed by the deposition (e.g., printing, spraying, etc.) of the dielectric layer 54, followed by the printing of the optional phosphor layer 36, the transparent conductor layer 28, the LEDs 16, the dielectric layer 26, and the reflective conductor layer 24.

In another embodiment, the layers are successively formed over the substrate 22 in FIG. 2, and the only lamination is the top transparent film 48. In another embodiment, the transparent film 48 is deposited (e.g., printed) as a liquid and cured.

The entire structure may be as thin as 1 mm and very flexible.

The sensor 46 shown in FIG. 4 may be a small portion of a much larger sensor 46 having an array of touch positions.

The transparent electrodes 50/52 have thin, transparent traces leading to a detector 56 that addresses the various electrodes, such as using multiplexing, and detect the mutual capacitance between adjacent electrodes 50/52 (or any other adjacent electrodes). A parasitic capacitor is shown. By touching the film 48 near the electrodes 50/52 with a finger, the human body adds a capacitor to ground to the circuit, lowering the detected capacitance. When the electrodes 50/52 are addressed and the change in capacitance is detected by the detector 56, a processor cross-references the touched X-Y location with its associated function, assuming the touch sensor is not a single button sensor. That selected function, such as selecting the numeral 5 on a keypad, is then processed for the particular application. The detector 56 may be any suitable conventional detector, such as the capacitance detection circuit described in U.S. Pat. No. 8,610,009, incorporated herein by reference.

During the operation of the touch sensor, a voltage may be applied to the conductor layers 24 and 28 to illuminate the touch sensor. An LED controller 58 applies a suitable voltage to the LEDs 16 to control their illumination. A variable DC voltage or a pulsed voltage may be applied to control the brightness of the LEDs 16.

Figure 5:
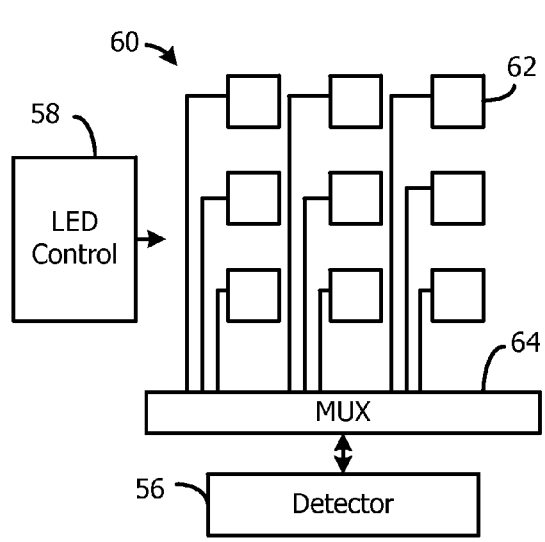
FIG. 5 is a schematic top down view of a simple 9-position touch sensor portion, using planar electrodes, that can determine a user's finger location by mutual capacitance or self-capacitance.

FIG. 5 is a schematic top down view of a simple 9-position touch sensor layer 60, using a planar array of transparent electrodes 62, that can determine a user's finger location by mutual capacitance or self-capacitance. A multiplexer 64 sequentially detects the mutual capacitances between all the adjacent electrodes 62. When a change in the capacitance is detected, the touch location is therefore known by its X-Y position, and the location signal is applied to a processor.

Figure 6:
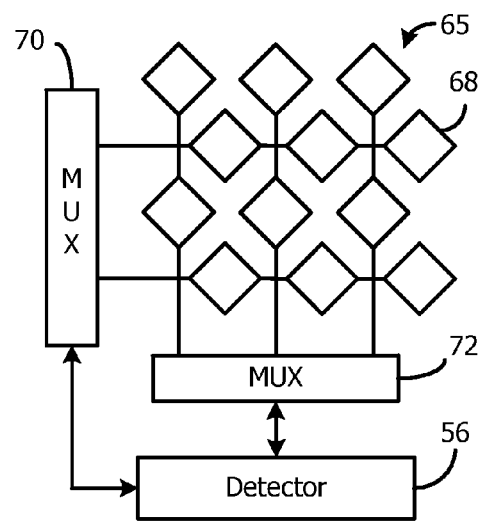
FIG. 6 is a schematic top down view of a simple 9 position touch sensor portion, using planar electrodes, that can determine a user's finger location by mutual capacitance when scanning X and Y electrodes.

FIG. 6 is a schematic top down view of another a simple 9-position touch sensor layer 65, with an arrangement of planar transparent electrodes 68 that can determine a user's finger location by mutual capacitance when scanning X and Y electrodes via multiplexers 70 and 72. The crossing narrow conductors are insulated from each other.

Figure 7:
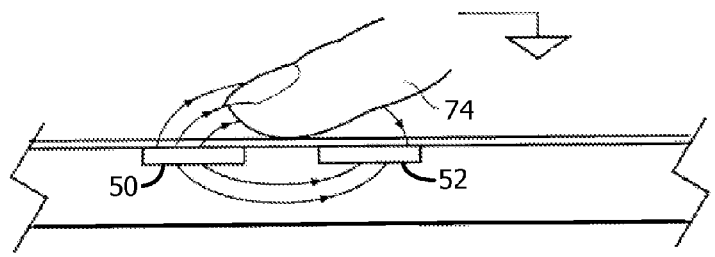
FIG. 7 illustrates how a finger changes the mutual capacitance between adjacent electrodes.

FIG. 7 illustrates how a finger 74 changes the mutual capacitance between adjacent electrodes 50 and 52 by providing a capacitance to ground. This change in capacitance is detected during the scanning by the multiplexer(s).

Alternatively, the self-capacitance of any single electrode, such as any of the electrodes 62 in FIG. 5, is detected. By touching above an electrode, the human body adds a capacitor to ground, thus changing the initial capacitance associated with the "touched" electrode. Accordingly, multiple simultaneous touches may be detected and processed.

Figure 8:
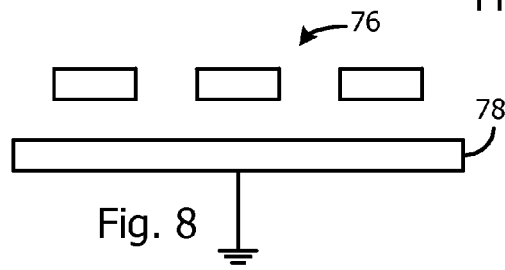
FIG. 8 is a cross-section of a touch sensor portion that detects the mutual capacitance between an upper array of electrodes and a bottom common electrode.

FIG. 8 is a cross-section of a touch sensor portion that detects the mutual capacitance between an upper array of electrodes 76 and a bottom common electrode 78. By touching near a pair of electrodes, the mutual capacitance changes, identifying the location of the touch.

Figure 9:
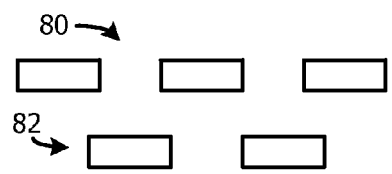
FIG. 9 is a cross-section of a touch sensor portion that detects the mutual capacitance between an upper array of electrodes and a lower array of electrodes.

FIG. 9 is a cross-section of a touch sensor portion that detects the mutual capacitance between an upper array of electrodes 80 and a lower array of electrodes 82. With such an arrangement, additional precision may be obtained.

Figure 10:
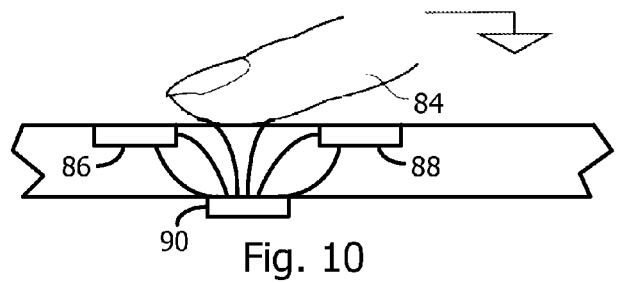
FIG. 10 illustrates how a finger changes the mutual capacitance between an upper array of electrodes and a lower array of electrodes.

FIG. 10 illustrates how a finger 84 changes the mutual capacitance between an upper set of electrodes 86 and 88 and a lower electrode 90.

Any of the touch sensor designs may be integrated with the printed LED layer. Any other type of touch sensor electrode arrangement may also be used with the LED layer 12.

Figure 11:
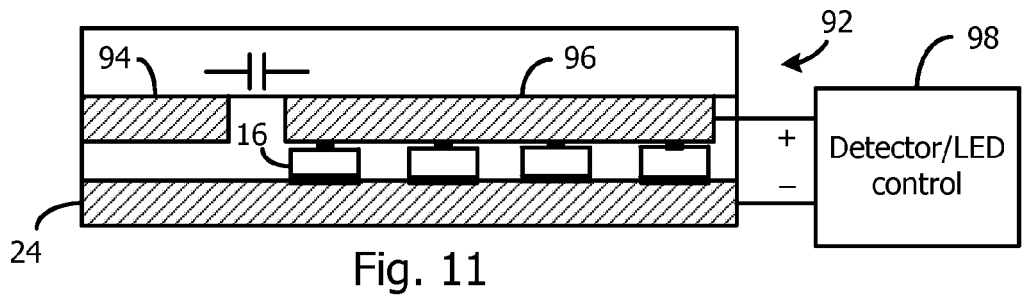
FIG. 11 is a cross-section of a small portion of an illuminated touch sensor, illustrating only one sensor touch position, where planar touch sensor electrodes overlie a layer of LEDs connected in parallel, where the top conductor for the LEDs serves as an electrode in the touch sensor for detecting mutual capacitance.

FIG. 11 is a cross-section of a small portion of another illuminated touch sensor 92, illustrating only one sensor touch position, where transparent planar touch sensor electrodes 94 and 96 overlie a layer of printed LEDs 16 connected in parallel, where the top conductor for the LEDs 16 serves as the electrode 96 in the touch sensor for detecting mutual capacitance between the planar electrodes 94 and 96. In another embodiment, the electrode 94 may be opaque since it will not block the LED light. A controller 98 applies a current to the LEDs 16 for illuminating them while also detecting the mutual capacitance. Any conventional capacitance detector may be used. If required, the application of the driving current for the LEDs 16 may be time-multiplexed with the detection signals.

Figure 12:
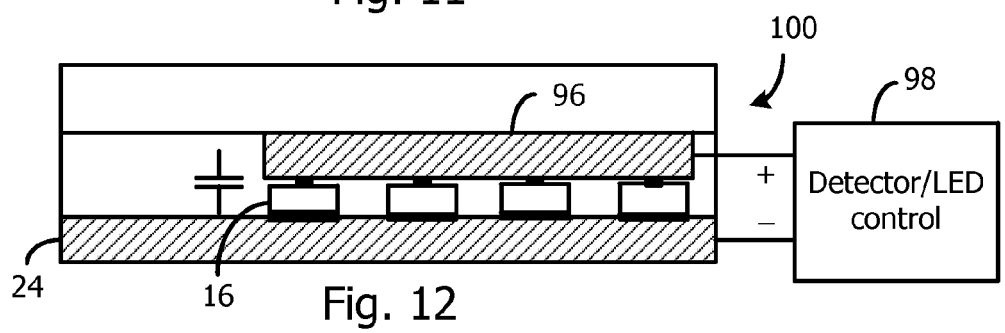
FIG. 12 is a cross-section of a small portion of an illuminated touch sensor, illustrating only one sensor touch position, where the upper and lower conductors for the LED layer also act as touch sensor electrodes for detecting mutual capacitance.

FIG. 12 is a cross-section of a small portion of another illuminated touch sensor 100, illustrating only one sensor touch position, where the upper and lower transparent conductors 96 and 24 for the LED layer also act as touch sensor electrodes for detecting the mutual capacitance between the conductors 96/24.

Figure 13:
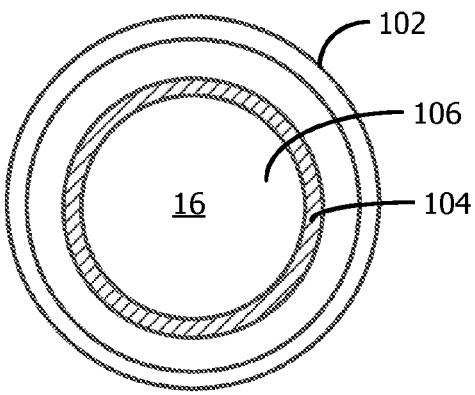
FIG. 13 is a top down view of a single sensor touch position, where an outer touch sensor electrode ring surrounds a combined inner sensor electrode/VLED conductor layer, where a mutual capacitance between the two sensor electrodes determines whether the area is touched. The sensor electrodes may be opaque since the VLED light exits through the center of the outer ring. The sensor electrodes may be planar or on different levels.

FIG. 13 is a top down view of a single sensor touch position, where an outer touch sensor electrode ring 102 surrounds a combined inner sensor electrode 104/VLED conductor layer, where a mutual capacitance between the two sensor electrodes 102/104 determines whether the area is touched. The "inner" electrode 104 may be the opaque bottom conductor for the LEDs 16, and the ring 102 may be formed planar with the transparent anode conductor layer 106 for the LEDs 16. The electrode 104 may be a conductor layer that extends under the entire touch sensor surface, such as the conductor layer 24 in FIG. 11. FIG. 11 may be used to illustrate a partial cross-section of FIG. 13, where the electrode 94 in FIG. 11 is a leftside portion of the ring 102 in FIG. 13, and the transparent electrode 96 in FIG. 11 is the transparent anode conductor layer 106 for the LEDs 16. The ring 102 may be formed of the same transparent conductor material used to form the transparent anode conductor layer 106. Alternatively, the ring 102 may be opaque to intentionally mask the LED light to highlight the touch position, or the ring 102 may be opaque if there are no LEDs beneath it. If the ring 102 can be opaque, it can be formed of a highly conductive metal layer. The LED light exits through the center of the ring 102. In another embodiment, the mutual capacitance between the ring 102 and the transparent anode conductor layer 106 is detected to determine a touched position.

Figure 14:
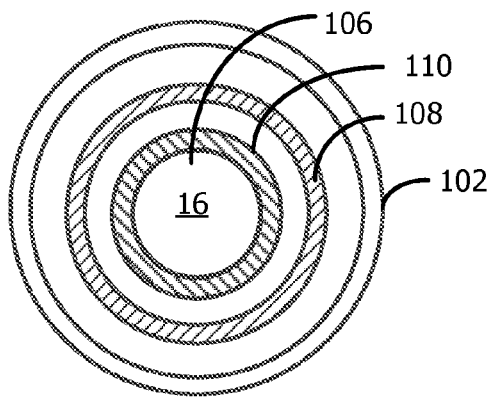
FIG. 14 is a top down view of a single sensor touch position, where an outer touch sensor electrode ring surrounds an inner sensor electrode ring, where a mutual capacitance between the two electrodes determines whether the area is touched. The VLED conductors are independent from the sensor electrodes, and the sensor electrodes may be opaque since the VLED light exits through the center of the inner ring.

FIG. 14 is a top down view of a single sensor touch position, where an outer touch sensor electrode ring 102 surrounds an inner sensor electrode ring 108, where a mutual capacitance between the two electrode rings 102/108 determines whether the area is touched. The rings 102/108 may be planar and in the same plane as the center transparent anode conductor layer 106 for the LEDs 16. In another embodiment, the rings 102/108 are in a plane different from the plane of the transparent anode conductor layer 106, such as shown in FIG. 4. The LED conductor layers 106 and 110 are independent from the sensor electrode rings 102/108, and the sensor electrode rings 102/108 may be opaque or transparent since the LED light exits through the center of the inner ring. The LED conductor layer 110 may be a conductor layer that extends under the entire touch sensor surface, such as the conductor layer 24 in FIG. 11. In all the embodiments, the starting substrate for printing the successive layers can be the substrate 22 in FIG. 1 or the transparent film 48 (or plate) of FIGS. 4, 11, and 12. The printing order will be opposite for the two starting substrates. If the substrate 22 is used as the starting substrate, the film 48 may be a lamination or formed by printing and curing a liquid.

Figure 15:
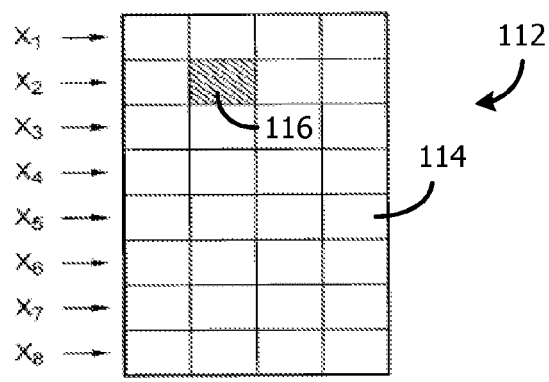
FIG. 15 is a top down view of one type of resulting illuminated touch sensor, where only one sensor position is illuminated by a portion of the LED layer for drawing attention to that area.

FIG. 15 is a top down view of one type of resulting illuminated touch sensor 112, having an array of transparent electrodes, where each electrode area 114 corresponds to a different touch area for making a selection. If all the LEDs 16 in the LED layer were interconnected by conductor layers, all the LEDs 16 would be illuminated upon the application of a driving current. However, if was desired to only illuminate sections of the LED layer, the conductors would be formed in electrically isolated sections (using screen printing) and separately switchable to the power source. For example, in FIGS. 11 and 12, if power was supplied only between the electrode 96 and the conductor layer 24, only the LEDs 16 in that particular touch area would be illuminated. Similarly, in FIG. 4, if the conductor 28 was segmented, and each segment was connected to a switch for coupling a driving current to the LEDs 16, different groups of LEDs 16 could be illuminated. Therefore, by being able to selectively couple a driving current to all the LEDs 16 simultaneously or only one or more selected groups of LEDs at a time, the touch sensor can be either generally illuminated or provide the user feedback or guidance by highlighting certain touch positions on the sensor.

Since many thousands of microscopic LEDs are printed in the LED layer, the LEDs can be printed in different patterns (e.g., by screen printing) to identify the functions of different touch areas of the sensor, such as by displaying the numbers 0-9 in a keypad touch sensor.

FIG. 15 illustrates that the LEDs are controlled to highlight a single touch position 116, such as to provide feedback to the user after the user touched that area.

Figure 16:
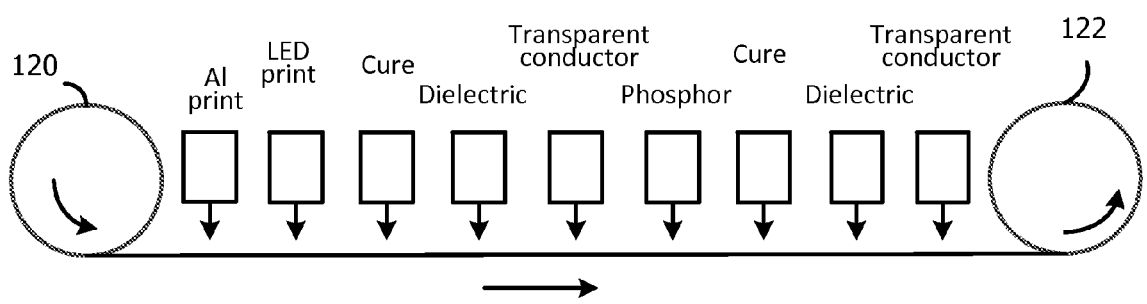
FIG. 16 schematically illustrates one possible assembly line for manufacturing the illuminated touch sensor by printing in a roll-to-roll process.

FIG. 16 schematically illustrates one possible assembly line for manufacturing the illuminated touch sensor by printing in a roll-to-roll process. The roll 120 contains the substrate material, and the roll 122 is a take-up roll. The various stations are labeled. In the example used to form the embodiment of FIG. 4, the reflective conductor layer 24 is formed by printing an aluminum layer. The LEDs 16 are then printed, followed by curing. The dielectric layer 26 is then deposited and cured, followed by printing the transparent anode conductor layer 28. Any phosphor layer 36 is then deposited, followed by curing. Another dielectric layer 54 may be deposited followed by forming the sensor electrodes. In another embodiment, the process is reversed, and the layers are successively formed over the transparent film 48 serving as the substrate. Similar roll-to-roll processes, performed under atmospheric conditions, may be used to form the other embodiments.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An illuminated capacitive touch sensor comprising:
   a first conductor layer;
   an array of vertical light emitting diodes (VLEDs) formed as a VLED layer, the VLEDs having a bottom electrode electrically contacting the first conductor layer;
   a transparent second conductor layer overlying the VLEDs, the VLEDs having a top electrode electrically contacting the second conductor layer;
   the VLEDs being illuminated by a voltage differential between the first conductor layer and the second conductor layer such that light passes through the second conductor layer; and
   a plurality of touch sensor electrodes formed as an electrode layer overlying and affixed to the VLED layer.

2. The sensor of claim 1 wherein the VLEDs comprise microscopic VLEDs printed as an ink to form a layer of VLEDs.

3. The sensor of claim 1 wherein the transparent second conductor layer also serves as one of the touch sensor electrodes.

4. The sensor of claim 1 wherein the transparent second conductor layer also serves as one of the touch sensor electrodes, wherein a mutual capacitance between the transparent second conductor layer and another of the touch sensor electrodes is detected to determine a position of a finger touching the sensor.

5. The sensor of claim 1 wherein the transparent second conductor layer also serves as one of the touch sensor electrodes, and the first conductor layer serves as a touch sensor electrode, wherein a mutual capacitance between the transparent second conductor layer and the first conductor layer is detected to determine a position of a finger touching the sensor.

6. The sensor of claim 1 wherein the plurality of touch sensor electrodes comprises a planar array of the touch sensor electrodes, wherein the transparent second conductor layer is located below and insulated from the planar array of touch sensor electrodes.

7. The sensor of claim 1 wherein the transparent second conductor layer is formed below a single touch position of the sensor, the sensor further comprising a plurality of conductor layers portions planar with the transparent second conductor layer, wherein each of the conductor layer portions is electrically connected to an associated group of the VLEDs to selectively illuminate a single group of the VLEDs at a single touch position of the sensor.

8. The sensor of claim 1 further comprising a wavelength conversion layer overlying the VLEDs.

9. The sensor of claim 1 wherein the array of VLEDs between the first conductor layer and the transparent second conductor layer is laminated to a sensor layer comprising the plurality of touch sensor electrodes.

10. The sensor of claim 1 further comprising a transparent touch sensor substrate, wherein the plurality of touch sensor electrodes, the transparent second conductor layer, the array of VLEDs, and the first conductor layer are deposited over the substrate.

11. The sensor of claim 10 wherein the plurality of touch sensor electrodes, the transparent second conductor layer, the array of VLEDs, and the first conductor layer are successively printed over the substrate.

12. The sensor of claim 10 wherein the VLEDs comprise microscopic VLEDs printed as an ink over the transparent second conductor layer.

13. The sensor of claim 10 wherein the transparent second conductor layer also serves as one of the touch sensor electrodes.

14. The sensor of claim 10 wherein the transparent second conductor layer also serves as one of the touch sensor electrodes, wherein a mutual capacitance between the transparent second conductor layer and another of the touch sensor electrodes is detected to determine a position of a finger touching the sensor.

15. The sensor of claim 10 wherein the transparent second conductor layer also serves as one of the touch sensor electrodes, and the first conductor layer serves as a touch sensor electrode, wherein a mutual capacitance between the transparent second conductor layer and the first conductor layer is detected to determine a position of a finger touching the sensor.

16. The sensor of claim 10 wherein the plurality of touch sensor electrodes comprises a planar array of the touch sensor electrodes, wherein the transparent second conductor layer is located below and insulated from the planar array of touch sensor electrodes.

17. The sensor of claim 1 wherein the touch sensor electrodes are transparent.

18. The sensor of claim 1 wherein at least some of the touch sensor electrodes are opaque.

19. The sensor of claim 1 wherein a first sensor electrode substantially surrounds a subset of the VLEDs.

20. The sensor of claim 19 wherein a second sensor electrode substantially surrounds the first sensor electrode and the subset of LEDs, wherein a mutual capacitance between the first sensor electrode and the second sensor electrode is detected to determine a touched position.

21. The sensor of claim 1 wherein the touch sensor electrodes are circular.

22. The sensor of claim 1 wherein at least some of the touch sensor electrodes do not overlie the VLEDs.

23. The sensor of claim 1 further comprising a substrate, wherein the first conductor layer, the array of VLEDs, the transparent second conductor layer, and the plurality of touch sensor electrodes are deposited over the substrate.

24. The sensor of claim 23 wherein the transparent second conductor layer also serves as one of the touch sensor electrodes.

25. The sensor of claim 23 wherein the transparent second conductor layer also serves as one of the touch sensor electrodes, wherein a mutual capacitance between the transparent second conductor layer and another of the touch sensor electrodes is detected to determine a position of a finger touching the sensor.

26. The sensor of claim 23 wherein the transparent second conductor layer also serves as one of the touch sensor electrodes, and the first conductor layer serves as a touch sensor electrode, wherein a mutual capacitance between the transparent second conductor layer and the first conductor layer is detected to determine a position of a finger touching the sensor.

27. The sensor of claim 23 wherein the plurality of touch sensor electrodes comprises a planar array of the touch sensor electrodes, wherein the transparent second conductor layer is located below and insulated from the planar array of touch sensor electrodes.

* * * * *